(12) United States Patent
Morse et al.

(10) Patent No.: US 7,730,021 B1
(45) Date of Patent: Jun. 1, 2010

(54) SYSTEM AND METHOD FOR GENERATING LANDING PAGES FOR CONTENT SECTIONS

(75) Inventors: Peter Neville Morse, Granville, OH (US); Paul Sidney Gregg, Canal Winchester, OH (US)

(73) Assignee: Manta Media, Inc., Columbus, OH (US)

( * ) Notice: Subject to any disclaimer, the term of this patent is extended or adjusted under 35 U.S.C. 154(b) by 139 days.

(21) Appl. No.: 11/046,054

(22) Filed: Jan. 28, 2005

(51) Int. Cl.
*G06F 17/30* (2006.01)

(52) U.S. Cl. .............................. 707/602; 705/54; 705/64

(58) Field of Classification Search ................ 715/762, 715/513, 259; 711/1; 707/501, 3, 1, 200, 707/203, 201; 705/54
See application file for complete search history.

(56) References Cited

U.S. PATENT DOCUMENTS

| | | | | |
|---|---|---|---|---|
| 6,058,373 | A * | 5/2000 | Blinn et al. .................. 705/26 |
| 6,415,294 | B1 * | 7/2002 | Niemi ........................ 707/102 |
| 6,973,445 | B2 * | 12/2005 | Tadayon et al. ............... 705/64 |
| 7,043,447 | B2 * | 5/2006 | Hughes et al. ................ 705/26 |
| 7,178,101 | B2 * | 2/2007 | Tunning ...................... 715/236 |
| 2002/0065857 | A1 * | 5/2002 | Michalewicz et al. ....... 707/532 |
| 2002/0065976 | A1 * | 5/2002 | Kahn et al. .................... 711/1 |
| 2002/0184159 | A1 * | 12/2002 | Tadayon et al. ............... 705/54 |
| 2003/0046311 | A1 * | 3/2003 | Baidya et al. ................ 707/200 |
| 2003/0110158 | A1 * | 6/2003 | Seals ............................ 707/1 |
| 2004/0003010 | A1 * | 1/2004 | Akazawa et al. ............. 707/203 |
| 2004/0012631 | A1 * | 1/2004 | Skorski ....................... 345/762 |
| 2005/0149862 | A1 * | 7/2005 | Weitzman et al. ........... 715/522 |
| 2005/0262062 | A1 * | 11/2005 | Xia ................................. 707/3 |

* cited by examiner

*Primary Examiner*—John R. Cottingham
*Assistant Examiner*—Sherief Badawi
(74) *Attorney, Agent, or Firm*—Standley Law Group LLP

(57) ABSTRACT

A content enhancement system and method for increasing search engine visibility is disclosed. Landing web pages are optimized for relevant keywords and phrases associated with e-content publications such as articles, papers, reports, newsletters, etc. Landing web pages may be generated for portions of documents that are sold individually. Landing pages are generated using content description data (including keyword data) for each document portion or content section that will be the subject of a landing page. The content description data is stored in a database. A template defines the layout and appearance of the content description data that is used to generate each landing page. Each landing page includes an optional link to a product purchase page at the publisher's web site that allows a user to purchase the product described on the landing page. Search engines index each of the landing pages making it easier for web users to locate the publisher's products.

12 Claims, 2 Drawing Sheets

SYSTEM AND METHOD FOR GENERATING LANDING PAGES FOR CONTENT SECTIONS

FIELD OF THE INVENTION

The present invention relates generally to search engine optimization techniques. In particular, the present invention relates to a system and method for generating landing pages to enhance the accessibility of e-content from search engines.

BACKGROUND OF THE INVENTION

The vast majority of Web users use search engines as their primary means for finding the Web information they need. Users select a search engine site and enter keywords related to the content or information they are seeking. It is common for 40% of e-content (articles, papers, reports, newsletters, etc.) sales to result from search engine traffic. This revenue growth is driven by several factors. First, visitor/customer conversion rates from search engine traffic are typically 300% higher than conversion rates from overall site traffic. For example, if the conversion rate for an e-commerce site is 1% for all traffic, the site can anticipate a 3% conversion rate from search engine driven traffic. Furthermore, demand usually increases over time. There is a compounding effect with repeat sales. Once customers have found a site, they often go directly to the site's URL instead of starting with a search engine.

To increase search engine traffic, most e-content publishers or providers attempt to market based on site keywords and phrases. Site keywords or phrases describe in general terms the content that is accessible from the site. Some providers complete a keyword analysis to identify additional keywords or phrases to include in their site description. While these efforts may result in some increase in traffic, they are not sufficient for several reasons. First, the web page structure is not search engine "crawlable" such that search engines can locate the page and analyze its content. Second, the site keywords or phrases do not appear in the locations within the web page that search engines are likely to analyze. Appropriate placement of keyword and phrases is an important factor in determining a web site search engine ranking. Finally, even if the provider creates web pages with appropriate structure and keywords/phrases, they become outdated quickly because search engine ranking methodologies change frequently. Because search engine ranking methodologies change, it is important to analyze and update web page structures and keyword phrase placement to respond to these changes in methodologies.

E-content publishers and providers that do not take full advantage of ubiquitous search engine inquiries to drive traffic to their site are missing an important ingredient for generating qualified site traffic. E-content publishers or providers with e-commerce sites already in place often cannot leverage search engine optimization (SEO—also known as search engine marketing or search engine placement) techniques to drive site traffic because their site architecture does not support an on-going SEO process. Effectively driving search engine traffic can have a profound impact on e-content publishers' web content sales.

SUMMARY OF THE INVENTION

The present invention is a content enhancement system and method for increasing search engine visibility. The present invention provides search engine visibility to commercial content or categories of content that are normally not visible to search engine crawlers. By enhancing this content, the present invention increases the number of highly-qualified site visitors and brings those visitors directly to the point-of-sale for the web site. The increased qualified traffic to the web site increases revenue for the ecommerce company.

The present invention generates "landing" (or content description) web pages that are optimized for relevant keywords and phrases associated with e-content publications such as articles, papers, reports, newsletters, etc. or any content accessible via a web site. Landing web pages may be generated for portions of documents that are sold individually or other content that may be accessed via the web site. The pages include relevant product or content information and optional links to the product purchase pages on the publisher's web site. Each landing page reflects the publisher's or provider's e-commerce site and brand so that users can quickly identify the source of the publication or content.

Landing pages are generated using content description data (including keyword and phrase data) for each document portion or content section that will be the subject of a landing page. The content description data is stored in a database. A template defines the layout and appearance of the content description data that is used to generate each landing page. Each landing page may include a link to a product purchase page at the publisher's web site that allows a user to purchase the product or content described on the landing page.

When a search engine crawls the publisher's web site, the landing page information for each document portion or content section is retrieved for indexing into the search engine. When a search engine user enters a keyword or phrase found on a landing page, a link to the landing page is provided in the search engine results. When the user selects the link on the search engine results page, the associated landing page is displayed. The user may then select a link on the landing page that directs the user to the publisher's product purchase page where the product or content that appears on the landing page may be purchased. Alternatively, the product or content could be purchased directly from the landing page.

DESCRIPTION OF EXAMPLE EMBODIMENTS

Figure 1:
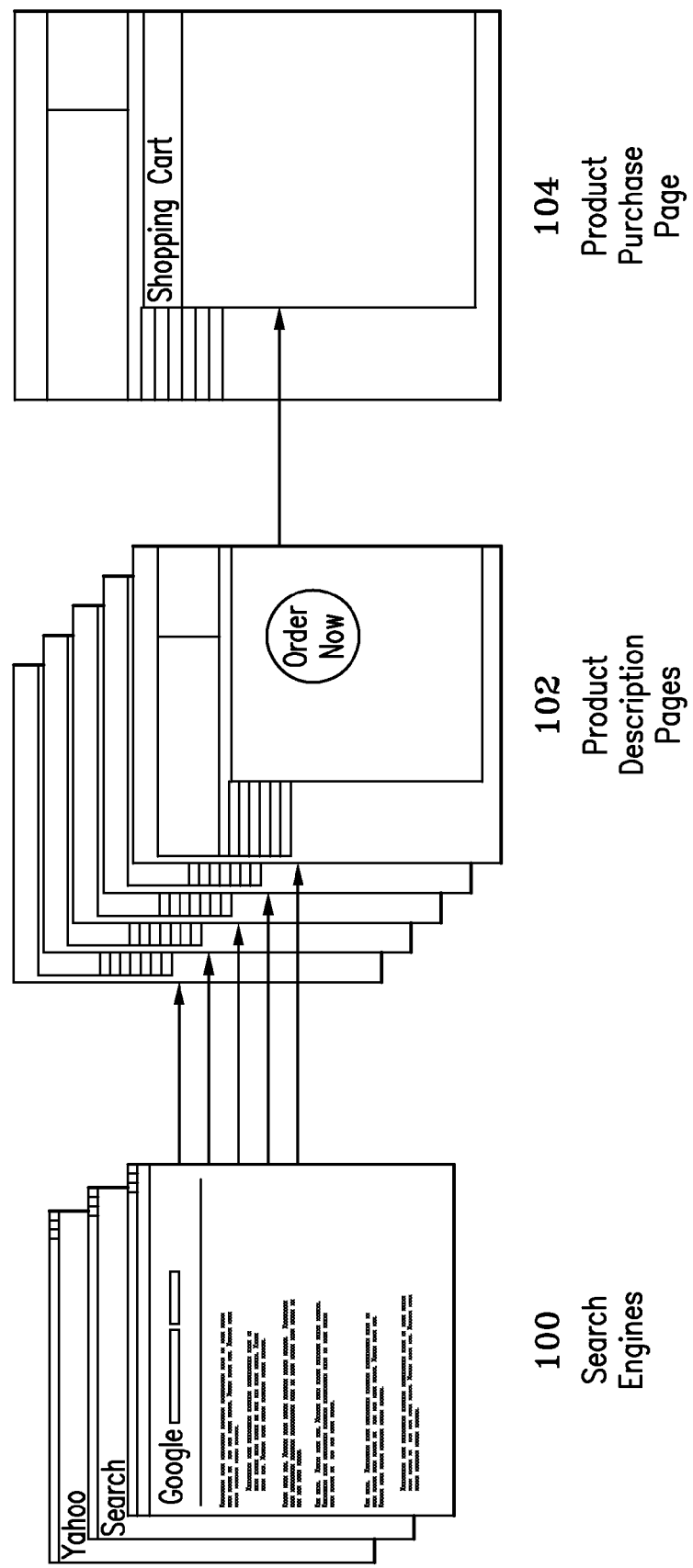
FIG. 1 illustrates the use of landing or content description pages according to an example embodiment of the present invention.

The present invention may be used in connection with e-content that is available at a web site. E-content includes publications such as articles, papers, reports, newsletters, etc. or any content accessible via a web site that may be of interest to site visitors. Typically, the e-content provider has a web site and an electronic catalog that supports the sale of content such as static, pre-formatted documents (i.e., publications such as articles, papers, reports, newsletters, etc.) and a wide variety of other digital files comprising content of interest to site visitors. A publisher's or content provider's catalog may support many different file formats including HTML, PDF, Microsoft® Word, Microsoft® Excel, Microsoft® PowerPoint, or other digital file formats.

An e-content publisher's web site may further support "fractional" document sales which enable a publisher to increase sales by dividing documents into sections and selling them by section, chapter, or even by the chart or table. Fractional selling is the process of dividing existing documents into smaller sections or portions that can be purchased individually. Fractional sale documents provide benefits to publishers as well as their customers. By offering to sell selected sections or portions of an e-content publication, a publisher is able to provide e-content in a range of price points to meet different customer needs. Customers may purchase only those sections or portions of the document that are relevant to their needs.

For example, a complete document may describe the results of a market study and have a price of $9,000. The actual document may comprise an executive summary section, a study methodology section, and a results section. One customer may be interested in the complete document while other another customer is interested in only the results section. The ability to price and sell each section separately allows the publisher generate more revenue than might otherwise be generated if all customers are required to purchase the entire document. The customer who is interested only in the results section may be not be willing to purchase the complete document for $9,000 but may be willing to purchase the results section for $3,000. The "fractional" sale therefore, benefits both the publisher and the customer. As may be appreciated by one of skill in the art, the concept of "fractional" sales may be applied to many different types of content available from a web site.

The present invention enhances search engine visibility by generating special "landing" (or content description) web pages that are optimized for relevant keywords and phrases associated with e-content which includes publications such as articles, papers, reports, newsletters, etc. Landing web pages may be generated for fractional sales documents or content. The pages include relevant content information along with optional links to the associated pages on the provider's web site that present the content and provide purchase capability. Each page reflects the provider's e-commerce site and brand so that users can quickly identify the source of the document or content. Once a user reaches a landing page for a particular document or content, the user may be enticed to search the providers site for additional publications or content of interest.

FIG. 1 illustrates the use of landing or content description pages according to an example embodiment of the present invention. Each landing or content description page 102 describes the document portion or content section and may have a link to the provider's product page 104 that allows the document portion or content section to be purchased. When a search engine crawls the provider's web site 100, the landing page information for each page is retrieved for indexing into the search engine. When a search engine user enters a keyword or phrase found on the landing pages, links to the landing pages are provided in the search engine results. When the user selects a link on the search engine results page 100, the associated landing page 102 is displayed. Each landing page 102 may have a link to the provider's product purchase page 104 so that the user may purchase the document portion or content section associated with the landing page. As illustrated in FIG. 1, several landing pages—one for each document portion or content section—may be generated for one product purchase page that supports the purchase of each of the multiple document portions or content sections.

Figure 2:
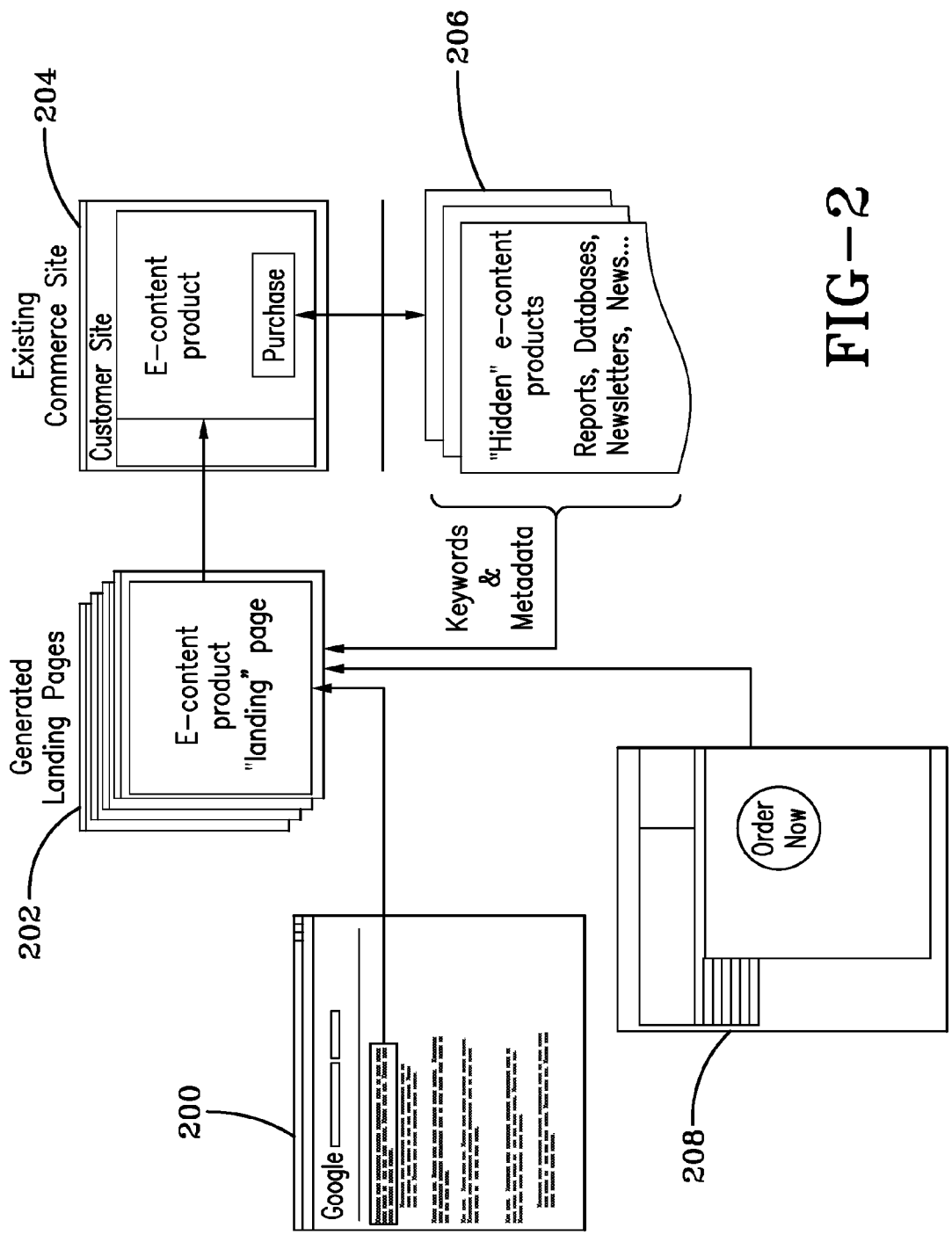
FIG. 2 is a technical overview diagram of landing page generation according to an example embodiment of the present invention.

Referring to FIG. 2, a technical overview diagram of landing page generation according to an example embodiment of the present invention is shown. E-content products (i.e., publications such as articles, papers, reports, newsletters, etc.) are analyzed to identify relevant description information and in the case of published documents, citation information and to identify keywords or phrases for each document portion or content section in the product. Citation and description information as well as relevant keywords or phrases are typically different for individual document portions or content sections than they are for the complete document or related content. The e-content provider may provide the description information and the keywords and phrases in the form of a data feed 206. One database record may be created for each individual document portion or content section that will be the subject of a landing or content description page.

Landing pages are created using a template 208 that specifies the layout and appearance of a web page. The data feed entries 206 and templates 208 are then used to create landing pages 202 for each individual document portion or content section. Landing pages for each document portion or content section include relevant product information along with optional links to the associated product purchase page 204 at the provider's web site.

Landing pages or content description pages are optimized for search engines 200 by using keywords or phrases that are associated with the document portion or content section. In an example embodiment of the present invention, approximately 40 targeted keywords per document portion or content section are defined. One such system that is especially well-suited for the purpose of developing targeted keywords is described in U.S. patent application Ser. No. 11/045,912, entitled AUTOMATED KEYWORD ANALYSIS SYSTEM AND METHOD.

The landing pages 202, which may be stored at a web site separately from the provider's e-content web site, are crawled and indexed by search engines 200. When a search engine user enters a keyword or phrase found on a landing page, a link to the landing page appears in the search engine results 200. When the user selects the link, the associated landing page 202 is displayed. Each landing page 202 has an optional link to the provider's product purchase page 204 so that the user may access the product purchase page and purchase the document portion or content section associated with the landing page.

Landing pages according to the present invention provide many benefits to e-content publishers and their customers. First, they significantly increase search engine visibility by increasing the number of pages available for indexing. Furthermore, they provide descriptive information for individual document portions or content sections that are unlikely to be located using keywords or phrases that describe only the overall topic or subject matter of a large document or related. Landing pages further generate revenue by directing users to relevant product purchase pages. This direct path from a content description page to a product purchase page increases user conversion rates. It also enhances the ability of a publisher or e-content provider to up-sell and cross-sell. Once customers arrive at the product purchase pages, they may navigate the site and find other products that are of interest. This difference, at the document level, is considerable in connecting potential buyers with the specific content they seek.

As may be appreciated by one of ordinary skill in the art, the present invention may be implemented using one or more software components that operate in conjunction to provide the features and functionality of the present invention. Document description data provided by publishers may be stored in a database that is accessible to a software component that generates landing pages using a template and the document description data from the database. The landing pages may then be stored on a server accessible to search engine crawlers so that the landing pages may be indexed into multiple search engine databases.

While example embodiments of the invention have been illustrated and described, various modifications and combinations can be made without departing from the spirit and scope of the invention. Modifications, combinations, and equivalents to the system and method of the present invention are intended to be covered and claimed.

What is claimed is:

1. A computerized method for generating web pages to increase accessibility to web site content for publications comprising:
   receiving a data feed at a computer from an e-content publisher entries for content description data, each of said entries comprising data for:
   (a) a publication divided into a plurality of content sections for fractional sales of said publication, said publication comprising a plurality of pages and each of said content sections comprising at least a portion of a page of said publication;
   (b) a citation relevant to said publication;
   (c) keywords specific to said content of said content section resulting from application of an automated keyword analysis to content within each said content section of said publication to produce a keyword set comprising;
   storing at said computer in a database content description data for each of said plurality of content sections, said content description data comprising said keyword set specific to content in each said content section of said publication and comprising at least a portion of said citation information for said publication;
   providing to said computer a template for a web page, said template specifying a layout and appearance of content description data in said web page;
   generating at said computer a content description page for each of said plurality of content sections for said publication according to said content description data for each of said plurality of content sections and said template;
   adding at said computer to each of said content description pages a link to a product purchase page for purchasing said content section described in said content description page; and
   storing at said computer each of said content description pages in a web site location accessible to a web site search engine that indexes said content description pages for retrieval according to said keyword set in said content sections for said publication.

2. The method of claim 1 wherein said publication is selected from the group consisting of article, paper, report, and newsletter.

3. The method of claim 1 wherein storing in a database content description data further comprises storing description information and keyword phrases for each of said plurality of content sections.

4. The method of claim 1 wherein storing each of said content description pages comprises storing said content description pages in a location independent of said product purchase pages.

5. A computerized method for providing e-content from a provider comprising:
   receiving at a computer a data feed from said provider entries comprising content description data for:
   (a) a publication for fractional sales of said publication at a web site, said publication comprising a plurality of pages;
   (b) citation information relevant to said publication;
   (c) a plurality of content sections for said publication wherein each of said content sections comprises at least a portion of a page of said publication;
   (d) a plurality of keywords specific to each of said content sections resulting from application of an automated keyword analysis to content within each said content section of said publication;
   generating at said computer a plurality of content description pages wherein each of said content description pages comprises said content description data with keywords specific to said content in a content section of a publication and comprises at least a portion of said citation information for said publication;
   adding at said computer to each of said content description pages a link to a product purchase page for purchasing said content section described in said content description page;
   storing at said computer each of said content description pages in a web site location accessible to a web site search engine that indexes said content description pages for retrieval according to said keywords specific to said content sections;
   receiving at said computer from computer users requests for said content description pages and said product purchase pages;
   transmitting from said computer for display to a computer user at least one content description page in response to said computer user's selection of a link in a search engine results page to said at least one of said content description pages; and
   transmitting from said computer for display to said computer user said product purchase page for purchasing said content section in response to said computer user's selection of a link to said product purchase page appearing on said at least one of said content description pages.

6. The method of claim 5 wherein said publication is selected from the group consisting of article, paper, report, and newsletter.

7. The method of claim 5 wherein generating a plurality of content description pages comprises generating said content description pages using said content description data comprising said keywords and said at least a portion of said citation information for said publication and a template specifying the appearance and layout of said content description data.

8. The method of claim 7 wherein said content description data further comprises description information and keyword phrases.

9. A computerized method for generating web pages to increase accessibility to web site content for publications comprising:
   receiving a data feed at a computer from an e-content publisher entries for content description data, said entry data comprising:
   (a) a publication divided into a plurality of content sections for fractional sales of said publication, said publication comprising a plurality of pages and each of said content sections comprising at least a portion of a page of said publication;
   (b) citation information relevant to said publication;
   (c) keywords specific to content in each of said content sections;
   storing at said computer in a database records comprising content description data for each of said content sections of said publication, said content description data comprising said keywords specific to content in each said content section of said publication and comprising at least a portion of said citation information for said publication;

providing at said computer a template for a web page, said template specifying a layout and appearance in said web page of said content description data for each of said plurality of content sections;

generating at said computer a content description web page for each of said database records according to said content description data and said template;

adding at said computer to each of said content description web pages a link to a product purchase page for said content section; and storing at said computer each of said content description web pages in a web site location accessible to a web site search engine that indexes said content description pages for retrieval according to keywords in said content sections.

10. The method of claim 9 wherein said publication is selected from the group consisting of article, paper, report, and newsletter.

11. The method of claim 9 wherein storing in said database records comprising content description data for each of said plurality of content sections further comprises storing description information and keyword phrases for each of said plurality of content sections.

12. The method of claim 9 wherein storing each of said content description pages in a location accessible to a web site search engine comprises storing said content description pages in a location independent of said purchase pages for said content description pages.

* * * * *